UNITED STATES PATENT OFFICE.

JAMES PERKINS, OF NEWARK, NEW JERSEY.

IMPROVEMENT IN PRESERVING EGGS, MEATS, &c.

Specification forming part of Letters Patent No. 42,396, dated April 19, 1864.

*To all whom it may concern:*

Be it known that I, JAMES PERKINS, of the city of Newark, in the county of Essex and State of New Jersey, have invented a new and useful Improvement in Preserving Eggs, Meats, Ham, Bread-Stuffs, Vegetables, and Fruits; and I do hereby declare that the following is a full description of all my said invention.

The nature of my invention consists in retaining the natural moisture of the egg, fruit, or other production, also in excluding external moisture and atmospheric gases from the same by the application of a thorough coating of the varnish commonly known as "shellac varnish," composed of the lac of commerce dissolved in alcohol or other solvents, whether said lac—viz., the resinous exudation from the twigs and branches of various kinds of trees in the East Indies, caused by the punctures of the insect *Coccus lacca* or *Coccus ficus*—is in the stick, seed, or shell state, and prepared with the introduction and admixture of gum-arabic and balsamic rosins dissolved in alcohol or other solvents.

The process of the application of my invention consists generally in simply varnishing over or coating the exterior of the egg, sweet potato, or bread-stuffs and meats, for transportation and long voyages with the varnish; but in the case of fresh meats, fruits, or delicate vegetables they are first coated with the varnish, after which they are wrapped in tissue or other paper, or thin muslin, and dipped in the varnish until the exterior covering is thoroughly coated with the varnish and all the intricacies filled up. I have found by experiment that in the case of eggs varnished as described the preservation is perfect, and I believe that with proper care in application my invention will be found equally successful with the other articles named, and I believe that lac dissolved in any sufficient way is the only production known which will effect a thorough and lasting protection and preservation against absorption or evaporation, decomposition or decay of any and all the fruits, &c., named.

What I claim as my invention, therefore, and desire to secure by Letters Patent of the United States, is—

The application and use of lac varnish in combination with gum-arabic, substantially in the manner and for the purposes described.

JAMES PERKINS.

Witnesses:
CALVIN CROWELL,
DANIEL F. TOMPKINS.